United States Patent [19]
Holt et al.

[11] 4,033,813
[45] July 5, 1977

[54] METHOD OF DETECTING LEAKAGE OF REACTOR CORE COMPONENTS OF LIQUID METAL COOLED FAST REACTORS

[75] Inventors: Fred E. Holt; Robert J. Cash; Robert E. Schenter, all of Richland, Wash.

[73] Assignee: The United States of America as represented by the United States Energy Research and Development Administration, Washington, D.C.

[22] Filed: Oct. 22, 1975

[21] Appl. No.: 624,804

[52] U.S. Cl. .......................... 176/19 LD; 176/86 R
[51] Int. Cl.² .............................. G21C 17/04
[58] Field of Search ............... 176/19 LD, 80, 86 R

[56] References Cited
UNITED STATES PATENTS 3,157,580  11/1964  Williams ............................. 176/80
3,663,363  5/1972   Crouthamel et al. ......... 176/19 LD

OTHER PUBLICATIONS

IDO-16880-2, TID-4500 (31st Ed.), (Aug. 1964), Scintillation Spectrometry-Gamma Ray Spectrum Catalogue Plate 54-125-1.
Nuclear Technology (vol. 26, Aug. 1975), Strand et al., pp. 472-479.
Nuclear Technology, (vol. 24, Nov. 1974), McCormick et al., pp. 149-155.
S5699 0302S, 3/75, Brunsow.
Trans. Am. Nucl. Soc. (15,462-15,463, 1972), Schenter et al.
Trans. Am. Nucl. Soc. (15,950-15,951, 1972), Boulette et al.

*Primary Examiner*—Samuel W. Engle
*Assistant Examiner*—S. A. Cangialosi
*Attorney, Agent, or Firm*—Dean E. Carlson; Robert M. Poteat; R. Keith Sharp

[57] ABSTRACT

A method of detecting the failure of a sealed non-fueled core component of a liquid-metal cooled fast reactor having an inert cover gas. A gas mixture is incorporated in the component which includes Xenon-124; under neutron irradiation, Xenon-124 is converted to radioactive Xenon-125. The cover gas is scanned by a radiation detector. The occurrence of 188 Kev gamma radiation and/or other identifying gamma radiation-energy level indicates the presence of Xenon-125 and therefore leakage of a component. Similarly, Xe-126, which transmutes to Xe-127 and Kr-84, which produces Kr-85$^m$ can be used for detection of leakage. Different components are charged with mixtures including different ratios of isotopes other than Xenon-124. On detection of the identifying radiation, the cover gas is subjected to mass spectroscopic analysis to locate the leaking component.

2 Claims, No Drawings

METHOD OF DETECTING LEAKAGE OF REACTOR CORE COMPONENTS OF LIQUID METAL COOLED FAST REACTORS

BACKGROUND OF THE INVENTION

This invention was made in the course of or under a contract with the U.S. Atomic Energy Commission (now the U.S. Energy Research and Development Administration). It relates generally to detection methods for liquid metal fast breeder reactors and more particularly to a method of detecting failure of sealed non-fueled reactor core components, such as boron carbide control rods, biaxial stress capsules, etc.

It is highly desirable to be able to detect failures of nuclear core components, such as fuel elements, control rods and test capsules. In liquid metal cooled fast reactors the core is blanketed by an inert cover gas, such a argon. During the operation of such a reactor, highly radioactive fission products are produced in the fuel. Some of them are gases and on failure of a fuel element pass into the cover gas where their presence can be detected by radiation detection. This provides a simple method for determining when an element failure has occured but, of course, does not identify the location of the element which has failed.

It is also desirable to know when a failure has occurred in a control rod, test capsule, or other non-fuel core component. Such components doe not produce fission gases during reactor operation and therefore do not, in their unmodified form, permit detection of leakage by radiochemical anaylsis of the cover gas.

A method of locating a fuel element which has failed is disclosed in U.S. Pat. No. 3,663,363 to Carl E. Crouthamel et al. This patent discloses the addition of different specific isotopic mixtures of xenon into different fuel elements. On failure of a fuel element the xenon mixture passes into the cover gas where it can be identified by mass spectroscopy. The xenon isotopes used for identification are those having mass numbers 124–130, which do not form substantial proportions of the fission gases. It is stated in the patent that they are "unaffected by irradiation." This is, however, a statement which is subject to important qualifications which, as will later appear, form the basis of this invention.

The Crouthamel et al. patent disclosed the use of different ratios of two selected xenon isotopes. Later development has involved the use of additional isotopes, e.g., two isotopes of xenon and three of krypton, thereby making it possible to uniquely identify more fuel elements of fuel elements. See U. S. application Ser. No. 476,500, June 5, 1974, by Norman J. McCormick now U.S. Pat. No. 3,959,069. See also McCormick and Schenter, "Gas Tag Identification of Failed Fuel-I Synergestic Use of Inert Gases," Nuclear Technology, Vol. 24, November 1974, pp. 149–155; and McCormick, "Gas Tag Identification of Failed Fuel-II Resolution Between Single and Multiple Failures," Nuclear Technology, Vol. 24, November 1974, pp. 156–167.

As disclosed on page 166 of the last article cited above this method of identification has also been applied to control assemblies.

One of the xenon isotopes proposed for use in the references cited above is Xenon-124. The Crouthamel patent specifically discloses the use of mixtures of Xenon-124 with Xenon-128 or 129.

The method described above has come to be commonly referred to in the art as "gas tagging" and the individual isotopic mixtures "tag gas."

SUMMARY OF THE INVENTION

The use of an isotopic mixture containing Xenon-124 in a sealed non-fueled fast reactor core compound makes possible the detection of a leak in such a component radiochemically by analyzing of the cover gas for the presence of Xenon-125. Contrary to what might be expected from the disclosures in the Crouthamel patent, a sufficient number of atoms of Xenon-124 undergoes the reaction $^{124}Xe\,(n,\gamma)\,^{125}Xe$ with the emission of sufficient 188 Kev gamma radiation, and other identifying gamma radiations associated with the decay of the 17 hour half-life Xe-125, to be detected above the background of the reactor by a Ge(Li) detector. By utilizing isotopic mixtures containing Xenon-124 a dual mode of operation is made possible, i.e., first a prompt and simple detection of failure by radiation detection and secondly, an identification of the individual failed core component by mass spectroscopy.

While Xe-124 is the isotope preferred at present, Xe-126, which transmutes to the 32 day half-life Xe-127 or Kr-84, which produces Kr85$^m$, the 4.4. hr. half-life metastable isotope of Kr-85, can be used instead.

DETAILED DISCLOSURE

In operation, a sample of the cover gas is continuously passed over a radiation detector provided with a multi-channel analyzer and the results are displayed on a screen and/or recorded on a strip chart. Such an analyzer displays the intensity of the radiation at the various energy levels. When a "spike" appears at the 188 Kev or other selected location, the mass spectrometry system is activated by the operator and the determination of the location of the failed element is begun. It is also possible to provide electronic circuitry which will sound an alarm or automatically switch on the mass spectrometry system when a spike of at least a certain height appears at this energy level.

In the preferred embodiment, we utilize a set of gas tags such as are disclosed in the McCormick article and application, which involves the use of different ratios of three different pairs of isotopes and include in each tag gas a sufficient amount of Xenon-124 whereby the 188 Kev gamma radiation peak of the Xenon-125 isotope is readily detectable by radiochecmical analysis of the reactor core gas. Xenon-124 is a particularly desirable element for use as a leak detector. It is one of the isotopes already present in the tag gases normally used for identification of failed components. Of the four lowest Xenon isotopes (Xe-124, -126, -128, and -129), it has the highest activation cross section for the $(n,\gamma)$ reaction. Its Xenon-125 transmutation product has been found to be radily detectable in argon cover gas over the background radiation present in fast breeder reactors.

There are advantages in utilizing ratios of isotopes other than Xenon-124 for location of the failed element. The neutron capture cross section of Xenon-124 increases rapidly withdecrease in neutron energy. In some fast reactors the neutron spectrum is sufficiently "soft," i.e., contains sufficient lower energy neutrons, to give sufficient reaction with the Xenon-124 to interfere with the identification.

The various compositions are made by combining commercial mixtures such as are shown on page 150 of the McCormick and Schenter article.

A set of compositions for the Fast Flux Test Facility at Richland, Washington is shown in Table I.

TABLE I

Ratios and Compositions of 24 Unique Synergistic Krypton/Xenon Gas Tags for Control Rod Pins for FFTF

| Tag No. | Kr 82/80 | Kr 78/80 | Xe 126/129 | % 24 in Xe | Rod Type |
|---|---|---|---|---|---|
| 1 | 3.575 | .2250 | .0222 | 1.4 | SR (1) |
| 2 | 3.600 | .2980 | .0222 | 1.4 | SR |
| 3 | 2.900 | .2500 | .0222 | 1.4 | SR |
| 4 | 3.350 | .3700 | .0222 | 1.4 | SR |
| 5 | 2.780 | .3125 | .0222 | 1.4 | SR |
| 6 | 2.875 | .2000 | .0222 | 1.4 | SR |
| 7 | 2.16 | .690 | .0122 | .7 | CR (2) |
| 8 | 2.60 | .790 | .0122 | .7 | CR |
| 9 | 1.77 | .730 | .0122 | .7 | CR |
| 10 | 1.70 | .900 | .0122 | .7 | CR |
| 11 | 2.15 | .910 | .0122 | .7 | CR |
| 12 | 1.80 | .470 | .0122 | .7 | CR |
| 13 | 2.00 | .490 | .0149 | .9 | CR |
| 14 | 2.75 | .750 | .0149 | .9 | CR |
| 15 | 2.11 | .610 | .0149 | .9 | CR |
| 16 | 2.20 | .750 | .0149 | .9 | CR |
| 17 | 2.05 | .930 | .0149 | .9 | CR |
| 18 | 1.80 | .73 | .0149 | .9 | CR |
| 19 | 2.00 | .490 | .0100 | .5 | PSR (3) |
| 20 | 2.75 | .750 | .0100 | .5 | PSR |
| 21 | 2.11 | .610 | .0100 | .5 | PSR |
| 22 | 2.20 | .750 | .0100 | .5 | PSR |
| 23 | 2.05 | .930 | .0100 | .5 | PSR |
| 24 | 1.80 | .730 | .0100 | .5 | PSR |

(1) Safety Rod
(2) Control Rod
(3) Peripheral Shim Rod

The amount of Xenon-124 used varies with the type of rod because of the differences in the neutron fluence which they receive in a given period of time. Thus, the shim rods are left fully inserted in the core for long periods of time. The safety rods are inserted only to shut down the reactor. The control rods are intermediate in their degree of exposure.

In the above reactor there is about 200 cubic feet of argon cover gas, (standard temperature and pressure) which is purged at about 3 cubic feet per minute. The cover gas is continuously sampled and drawn through a delay bed containing about 1 gram of 50° F activated carbon at the rate of about 10 cubic centimeters per second. This gives a holdup time for the xenon of about 4 minutes. The delay bed is monitored by a Ge(Li) detector operated in conjunction with a multichannel analyzer. An electronic system is arranged to give an alarm on the occurrence of a present reading at the 188 Kev energy level. A sample of the cover gas is then removed and analyzed in a mass spectrograph to locate the failed rod.

While a detailed embodiment of the invention has been described, it will be apparent that various changes can be made.

As stated above, gamma radiation energy levels other than 188 Kev can be used for the detection of Xe-125. The isotope Xe-126 or Kr-85 can be used instead of Xe-124. In some cases a reactor may be allowed to continue to operate with failed components in place, causing a buildup of radioactive elements in the cover gas. In such a case, it mayb e desirable to carry out a gas separation, e.g., krypton from xenon, before measuring the gamma radiation.

What is claimed is:

1. In the operation of a liquid-metal-cooled fast neutron reactor, having an inert cover gas, the method of detecting failure of a sealed, non-fueled reactor core component and of detecting the location of said failed component consisting essentially of incorporating a tag gas in said sealed non-fueled component comprising different ratios of at least two isotopes selected from the group consisting of Krypton-78, Krypton-80, Krypton-82, Xenon-126, Xenon-128 and Xenon-129 to identify the location of failure of a said component and further incorporating in said tag gas Xenon-124 to identify the failure of said component, and radiochemically analyzing said cover gas for gamma radiation-energy level of 188 Kev for the presence of Xenon-125 until said Xenon-125 is detected, and subsequently analyzing said cover gas by mass spectrographic analysis for said tag gas ratios of said at least two isotopes to identify the location of said failed, non-fueled reactor core component.

2. A method as defined in claim 1, wherein said tags in different components comprise different ratios of at least two isotopes of krypton and at least two isotopes of xenon, the tag gas in each of said components including Xenon-124 in addition to said different ratios of said isotopes.

* * * * *